United States Patent [19]

Sisbarro et al.

[11] Patent Number: 5,438,861
[45] Date of Patent: Aug. 8, 1995

[54] APPARATUS AND METHOD FOR TESTING FOR HOLES IN A PROPHYLACTIC DEVICE

[75] Inventors: Frederick P. Sisbarro, Wayne; Glenn W. Thomsen, Cream Ridge, both of N.J.

[73] Assignee: Carter-Wallace, Inc., New York, N.Y.

[21] Appl. No.: 277,098

[22] Filed: Jul. 19, 1994

[51] Int. Cl.⁶ .......................... G01N 3/04; G01N 3/26
[52] U.S. Cl. ........................................ 73/40; 73/38
[58] Field of Search ............................ 73/40, 38

[56] References Cited

U.S. PATENT DOCUMENTS

| | | | |
|---|---|---|---|
| 2,126,434 | 8/1938 | Vosbury | 73/37 |
| 2,370,945 | 3/1945 | Fields | 73/37 |
| 2,567,926 | 9/1951 | Dunkelberger | 128/844 |
| 2,855,777 | 10/1958 | Garrett | 73/40 |
| 2,855,926 | 10/1958 | Koppelman | 128/202.13 |
| 3,177,704 | 4/1965 | Stange | 73/49.3 |
| 3,254,526 | 6/1966 | Yarbrough | 73/40 |
| 3,315,519 | 4/1967 | Ferguson | 73/40 |
| 3,389,811 | 6/1968 | Frank | 73/45.3 |
| 3,667,862 | 6/1972 | Parr | 416/61 |
| 3,991,604 | 11/1976 | Hayes et al. | 73/37 |
| 3,992,766 | 11/1976 | Field | 29/235 |
| 4,002,055 | 1/1977 | Kops | 73/40 |
| 4,118,972 | 10/1978 | Goeppner et al. | 73/40 |
| 4,683,745 | 8/1987 | Broughman, Jr. et al. | 73/49.2 |
| 4,855,169 | 8/1989 | McGlothlin et al. | 428/35.2 |
| 4,875,358 | 10/1989 | Marsh et al. | 73/40 |
| 4,954,309 | 9/1990 | McGlothlin et al. | 264/307 |
| 5,073,482 | 12/1991 | Goldstein | 73/38 |
| 5,097,697 | 3/1992 | Carnal et al. | 73/40 |
| 5,129,256 | 7/1992 | McGlothlin | 73/40 |
| 5,255,558 | 10/1993 | Hamilton | 73/40 |

FOREIGN PATENT DOCUMENTS 1182326A 9/1985 U.S.S.R. .

OTHER PUBLICATIONS

Porex Technologies, Product Brochures, ID #661-33-0-1098, 1989; #675330190, 1990; #79133072, 1992; #152330388; 1990; #578330388, 1990; #725330291, 1992; #152330388, 1992; #586330688, 1990; #725330291, 1990; #788330692, 1992; #586330688, 1990.

*Primary Examiner*—Hezron E. Williams
*Assistant Examiner*—J. David Wiggins
*Attorney, Agent, or Firm*—Watov & Kipnes

[57] ABSTRACT

Condoms and other sheaths are tested for holes by drawing the sheath over a hollow porous mandrel having smaller openings at its head end than in the rest of its body, providing a difference between the pressure within the mandrel and the pressure outside the condom, and comparing the rate of change of pressure within the mandrel with the rate of change of a reference pressure. The mandrel is shaped such that powder particles in the inner surface of the condom are moved toward the head of the mandrel where the smaller openings are when a condom is drawn onto it, for substantially preventing the powder from clogging the larger pores below the head region of the mandrel.

11 Claims, 5 Drawing Sheets

APPARATUS AND METHOD FOR TESTING FOR HOLES IN A PROPHYLACTIC DEVICE

FIELD OF THE INVENTION

This invention is in the field of testing the integrity of prophylactic devices, including condoms, gloves, and other thin walled devices of elastic material, for example.

BACKGROUND OF THE INVENTION

Whereas the reliability of prophylactic devices such as condoms has always been important, the prevalence of AIDS and the alarming increase in unwanted pregnancies has placed even greater emphasis on detecting holes-through which body fluids may pass. At the same time, it is important that the testing for holes be done as economically as possible. Ideally, no defective condoms should pass a test for holes and no acceptable condoms should fail it. It is the understanding of the inventors that the FDA requires testing for holes as small as 10 microns.

A number of testing methods are available. They include a water leak test in which the condom is filled with water and an operator visually checks its outer surface for water droplets. Small holes in the condom result in extremely small water droplets on the surface. These droplets are difficult to see even if the hole location is known before the test is performed. Under actual operating conditions, the failure to detect such a small water droplet could result in the acceptance of a defective condom. Unless extreme care is used, water droplets can be inadvertently deposited on the condom so that acceptable condoms are rejected. Furthermore, it is difficult for an operator to continue to keep a sharp eye out for the droplets. In addition to these difficulties, the inspection of a condom for droplets takes a long time.

Holes can also be detected by electrical methods. In a "wet test", a condom is stretched over a mandrel of conductive material and immersed in a conductive aqueous solution. A low voltage is applied between the mandrel and the solution so that the flow of current in the circuit thus formed indicates a hole. In a "dry test" method, the condom is stretched over a conductive mandrel and conductive brushes or a fine steel screen is placed in contact with the outer surface of the condom. Voltage is applied between the mandrel and the brush or screen so as to produce a current if there is a hole in the condom. But such methods do not work well for condoms made of certain non-latex material, such as polyurethane, for example.

U.S. Pat. No. 5,129,256 describes a method and apparatus for testing condoms by mounting them on a hollow porous mandrel, drawing a partial vacuum in the space within the mandrel and monitoring the interior of the porous mandrel for gas flowing through its walls with a vacuum pressure transducer. It is indicated that preferably the mandrel have an outside diameter that is less than the inside diameter of a condom. The pore openings in the wall are distributed substantially uniformly over its external surface and preferably have a median diameter ranging from ten to fifty microns with a preferred median diameter of twenty microns. The porous part of the mandrel is comprised of a cylindrical body that is closed off at one end, has a wall thickness between 0.04 to 0.50 of an inch and a void volume between 35% and 60%.

If the mandrel is made by sintering particles, fine pores are desired because the dimensions of the walls between pores at the surface of the mandrel are smaller and thus less likely to block a hole in a condom that is stretched over it.

SUMMARY OF THE INVENTION

In this invention, a condom or other prophylactic device is mounted on a porous hollow mandrel preferably having a corresponding shape, and a differential in pressure is established between the inside of the mandrel and the space outside of the condom. The differential can be obtained by increasing the pressure in the space outside the condom while the space inside the mandrel is at atmospheric pressure; or preferably by creating a partial vacuum inside the mandrel while the space outside the condom is at atmospheric pressure. The differential in pressure is established during a first period, the pressure within the mandrel is allowed to stabilize during a second period, and the rate of change of the pressure differential is checked within a third period to see if it exceeds a given value so as to indicate the presence of a leak through a hole in the condom. During the second and third periods, gas passing through a hole in the condom increases the pressure within the mandrel so as to provide an integrated effect, if the interior has a partial vacuum or if the space outside the mandrel and condom is at a higher pressure than interior to the mandrel. Sensitivity of the detection is also increased by mounting a solid object within the mandrel so as to fill most of its space. Pressures are checked at the beginning and end of the second and third periods, and the change during each period is compared to previously determined calibration limits to determine the acceptability of the condom.

In accordance with an aspect of this invention, the determination made during the third period referred to above as to whether the pressure within the mandrel is increasing rapidly enough (partial vacuum subsiding) to indicate a leak is made by comparing it with a standard pressure. If it is greater, a leak is present, but if it is not greater there is no leak. This is a more accurate method than making an absolute measurement of the pressure within the mandrel with a transducer.

As noted in the background section, from a theoretical viewpoint, the smaller the pores at the surface of the mandrel, the smaller the holes that can be detected in a condom. In accordance with an important aspect of this invention, the size of pores in the portion of the mandrel that will be adjacent the body portion of a condom during a test is small enough to detect holes of an acceptable minimum size at any point in the condom, but the size of the pores at the closed end of the mandrel that will be opposite the head of a condom is even smaller so that even smaller holes can be detected. This is important because the body fluid pressure that sometimes occurs in the head of a condom can stretch it so as to momentarily increase the size of a hole within it. Thus a hole that is acceptably small can become unacceptably large.

Although it takes longer to pump down the pressure in a mandrel to a given value when its pores are small than when its pores are large, the first period during which this process occurs is not significantly extended because only a small portion of the pores are of the smaller size in one embodiment of the invention.

It would be ideal to make a mandrel in such manner as to gradually increase the pore size from its closed end to its open end, but it is more practical to increase the pore size in successive sections.

Instead of limiting the sizes of pores in the portion of the mandrel that will be in contact with the body portion of the condom to a value that could be used for detecting holes in the head of the condom, they could be larger because larger minimum holes can be permitted as the base of the condom is approached. This would further reduce the time for testing in permitting reduced time for pulling or establishing a vacuum in the interior of the mandrel, in one embodiment of the invention.

Applicants have noted that some of the particles of powder with which condoms are coated when they are ready for;test are small enough to become lodged in larger pores in a mandrel so as to block them and thus possibly prevent a hole from being detected but large enough to bridge the smaller pores in such way as not to block them.

In accordance with another aspect of this invention therefore, the maximum diameter of the mandrel occurs between the portion that will be adjacent the head of a condom under test and the portion that will be adjacent its body portion. From the point of maximum diameter to its base the mandrel preferably tapers to a smaller diameter. The maximum diameter is such as to stretch a condom as it is being pulled over the mandrel and scrape loose powder particles toward the head of the condom. The scraping force will be greater with condoms having a tapered body section than with a condom having a cylindrical body portion. Thus the powder that might otherwise have blocked pores of the mandrel adjacent the body portion of a condom are moved along to the portion of the mandrel having relatively smaller pores that will not be blocked by the powder in this embodiment of the invention. In this manner the possibility of powder interfering with the detection of holes in a condom is reduced. The powder size is always kept larger than the largest pores at the top of the mandrel.

A method for performing the testing of a condom in accordance with the invention is comprised of the following steps:

a. Place condom on mandrel, stretching it to fit;
b. Evacuate the mandrel to a given pressure;
c. If given pressure cannot be attained within a predetermined time period, reject condom;
d. Wait for first period to allow for stabilization;
e. During second period, measure rate of change of differential pressure;
f. If rate of change of differential pressure exceeds a predetermined maximum value (A), reject condom;
g. During third period, measure rate of change of differential pressure;
h. If rate of change of differential pressure exceeds a predetermined maximum value (B), reject condom;
i. If rate of change of differential pressure is below a predetermined minimum value, reject condom;
j. Remove condom from mandrel;
k. Separate accepted and rejected condoms;
l. Introduce high pressure air to inside of mandrel and brush off outside of mandrel to remove powder;
m. If no rejects in X predetermined number of tests, or no accepts in Y predetermined number of tests, inspect test apparatus for mechanical failure.

BRIEF DESCRIPTION OF THE DRAWINGS

Various embodiments of the present invention are described below with reference to the drawings, wherein similar items are identified by the same reference designation, in which.

DETAILED DESCRIPTION OF THE INVENTION

Figure 1:
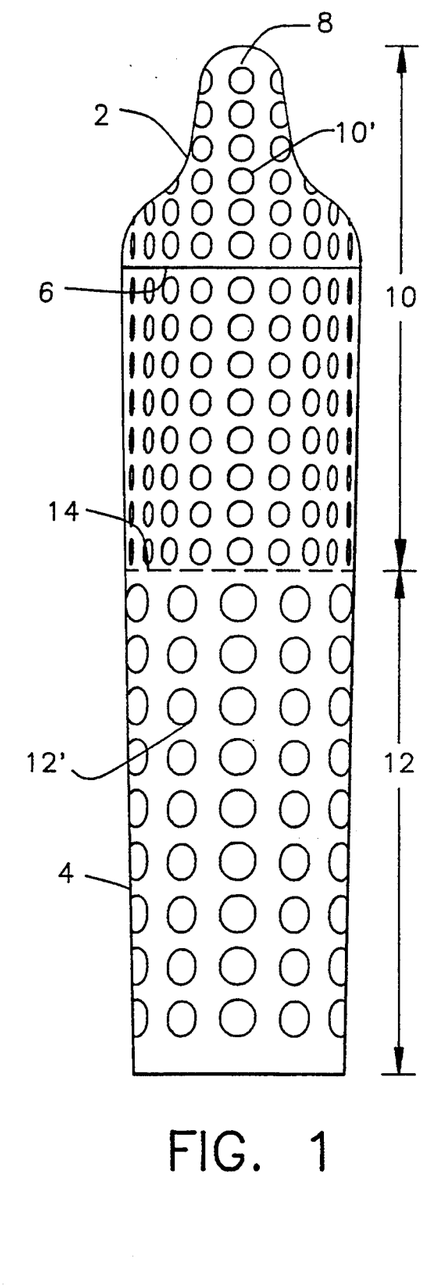
FIG. 1 is an external view of the porous part of a mandrel having respectively different sized pores in two sections.

Although not shown, all mandrels have cylindrical cross section at any point along their axes and are hollow, in this example. The porous portion of the mandrel shown in FIG. 1 is comprised of a head portion 2 and a tapered portion 4 that meet at their respective points of maximum diameter at a line 6. In this particular example, the head section 2 terminates in a nipple shaped closure 8 that is designed to fit a nipple, not shown, at the closed end of a particular condom. The nipple in a condom prevents it from being ruptured during use by providing a reservoir for seminal fluid. This also reduces the possibility of fluid being forced back along the condom and out of its open end.

In this particular embodiment of the invention, the mandrel is divided into two sections 10 and 12 on opposite sides of a dashed line 14. Pores in the section 10 are illustrated by small circles like 10', and pores in the section 12 are illustrated by larger circles like 12'. These circles are only intended to schematically illustrate the outer surfaces of the sections 10 and 12. In actual case they would be much smaller, closer together, and randomly distributed, typically in a Gaussian distribution. This random distribution of the pores occurs both on the surface and through the thickness of the mandrel. Satisfactory testing has been achieved by making the pores 10' have a nominal dimension of ten microns and the pores 12' have a nominal dimension of twenty microns.

Figure 2:
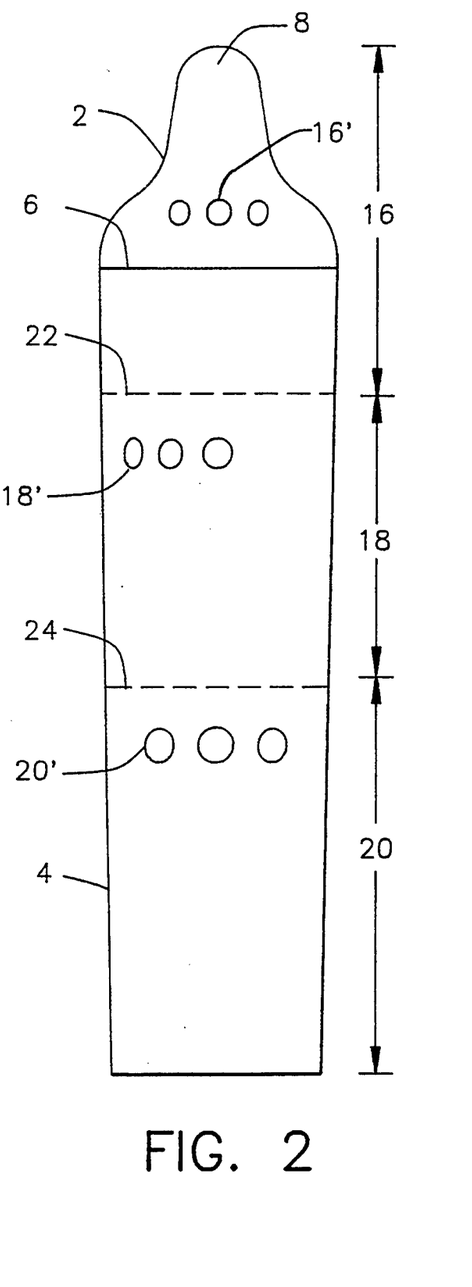
FIG. 2 is an external view of the porous part of a mandrel having respectively different sized pores in three sections.

The porous portion of a mandrel shown in FIG. 2 is similar to that shown in FIG. 1 except for the fact that it is divided into three sections 16, 18, and 20, as indicated by the dashed lines 22 and 24. The sections respectively have pores such as 16', 18', and 20' having nominal dimensions of ten, fifteen, and twenty microns, respectively, for example.

Figure 3:
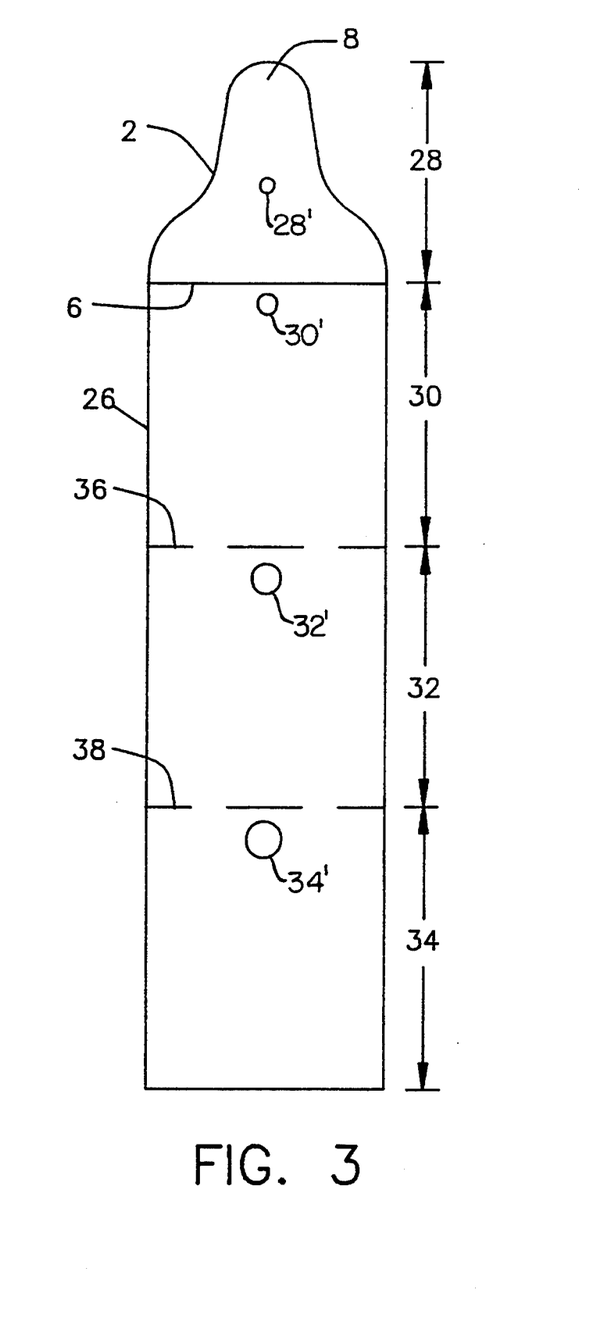
FIG. 3 is an external view of the porous part of a mandrel having respectively different sized pores in four sections.

The shape of the porous section of the mandrel shown in FIG. 3 differs from that of FIGS. 1 and 2 in that its body portion 26 is cylindrical instead of being tapered, for example. In this particular embodiment, porous section of the mandrel is divided into four sections 28, 30, 32, and 34 by the line 6 and two dashed lines 36 and 38. As in FIGS. 1 and 2, the sizes of the pores in successive sections from the closed end of the mandrel increases. Thus the pores 28', 30', 32', and 34' in the sections 28, 30, 32, and 34, respectively, have nominal dimensions of five, ten, fifteen and twenty microns, respectively, in this example.

Figures 4A, 4B:
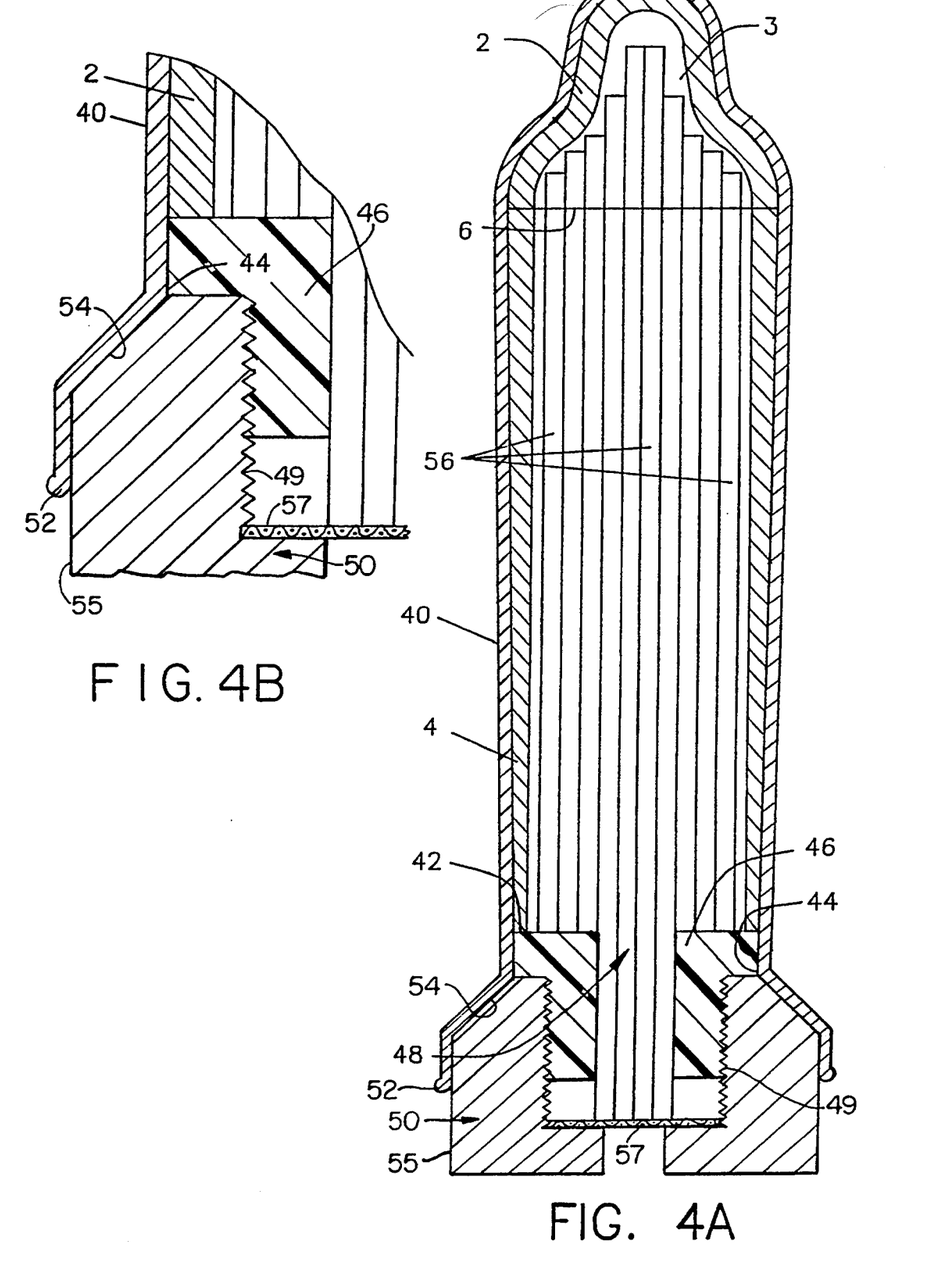
FIG. 4A is a cross section of a mandrel having a condom mounted therein.
FIG. 4B is an enlargement of the bottom of the mandrel of FIG. 4.

The cross section of a complete mandrel shown in FIG. 4A illustrates certain constructional details that may be used in conjunction with any of the porous sections of mandrels shown in FIGS. 1, 2 and 3, but the pores that extend through the walls are not shown in the interest of clarity. FIG. 4A happens to show a mandrel having a tapered body 4, but the details would be similar if the body had a uniform cross section like the body portion 26 of FIG. 3. A condom 40 is shown as being mounted on the mandrel so as to be ready for test.

As shown in FIGS. 4A and 4B, the bottom 42 of the body portion 4 of the mandrel is sealed to the top of a flange 44 of a plastic cap 46 having a hollow body portion 48 that is in threaded engagement with a hollow stainless steel mount 50, in this example. The condom 40 is stretched over the mandrel as previously described. A rim 52 at the bottom or open end of the condom 40 is pulled or stretched over a sloped flange portion 54 and outer sidewall portion 55 of mount 50. Note that the rim 52 is not required for test purposes, but is typically present on condoms. In this manner, a substantially airtight seal is obtained between the lower portion of condom 40 and mount 50. A thin stainless steel screen 57 is positioned at the bottom of hollow threaded portion 49 of mount 50, the function of which is described below. Thus there are only two ways air can get to the inside of the mandrel 2,4—through a hole in the condom 40 or through the center of the cap 46 and of the mount 50. The details just described are better seen in FIG. 4B.

In order to increase the speed of response, means such as polycarbonate rods 56 are mounted within the mandrel (2, 4) for excluding air from most of its interior cavity 3. Although other means may be used for this purpose, the rods 56 work very well. They are mounted in any suitable manner. In this example, the rods 56 are kept from falling partly or wholly out of mandrel (2, 4) via the stainless steel screen 57 being provided with a mesh size that is smaller than the outside diameter of the rods 56. Note that the same function of these rods 56 can alternatively be provided by a solid plug, or other suitable filler means. Regardless of the filler means employed, care must be taken to insure a free air path between the interior of mount 50, the interior walls of the mandrel and associated pores, and the hollow portion 48 of plastic cap 46.

As the condom 40 is being pulled over the maximum diameter at the line 6, where the head 2 and body portion 4 of the mandrel meet, free powder is scraped along so that it ends up between the head of the condom 40 and the head portion 2 of the mandrel 2,4. The powder particles are too large to block the small pores in the section 2, but might have blocked larger pores in the body portion 4, and are thereby prevented from doing so in this embodiment of the invention.

Mandrels 2,4 of the desired shape that have sections with pores of different dimensions can be supplied by Porex Technologies of 500 Bohannon Road, Fairburn, Ga. 30281-2828, U.S.A. A thickness of 0.125 inch has been found to withstand the forces exerted when the inside of the mandrel has a vacuum of $-14.1$ PSI (pounds per square inch) and the outside is subjected to atmospheric pressure. It is to be understood that the ten, fifteen and twenty micron dimensions mentioned in the description above can be changed without departing from the spirit and scope of the invention. The different pore dimensions are achieved by sintering plastic particles of different sizes. Practical manufacturing constraints only permit an average pore size to be obtained within a range, for any ideal pore size specified for a given section of a mandrel. In FIG. 1, for example, good results were obtained with a pore dimension of 6.04 microns with a 21.56% porosity for the ten micron section 10, and an average pore dimension of 29.42 microns with a porosity of 37.52% for the twenty micron section. In FIG. 2 the average pore dimensions for the sections 16, 18 and 20 were 6.38 microns, 28.35 microns and 31.86 microns, respectively, and the corresponding porosities were 22.73%, 38.21% and 31.86%, whereas the ideal pore sizes were 5 microns, 15 microns, and 25 microns, respectively. Manufacturing variations prevent ideal pore sizes from being attained.

Figure 5:
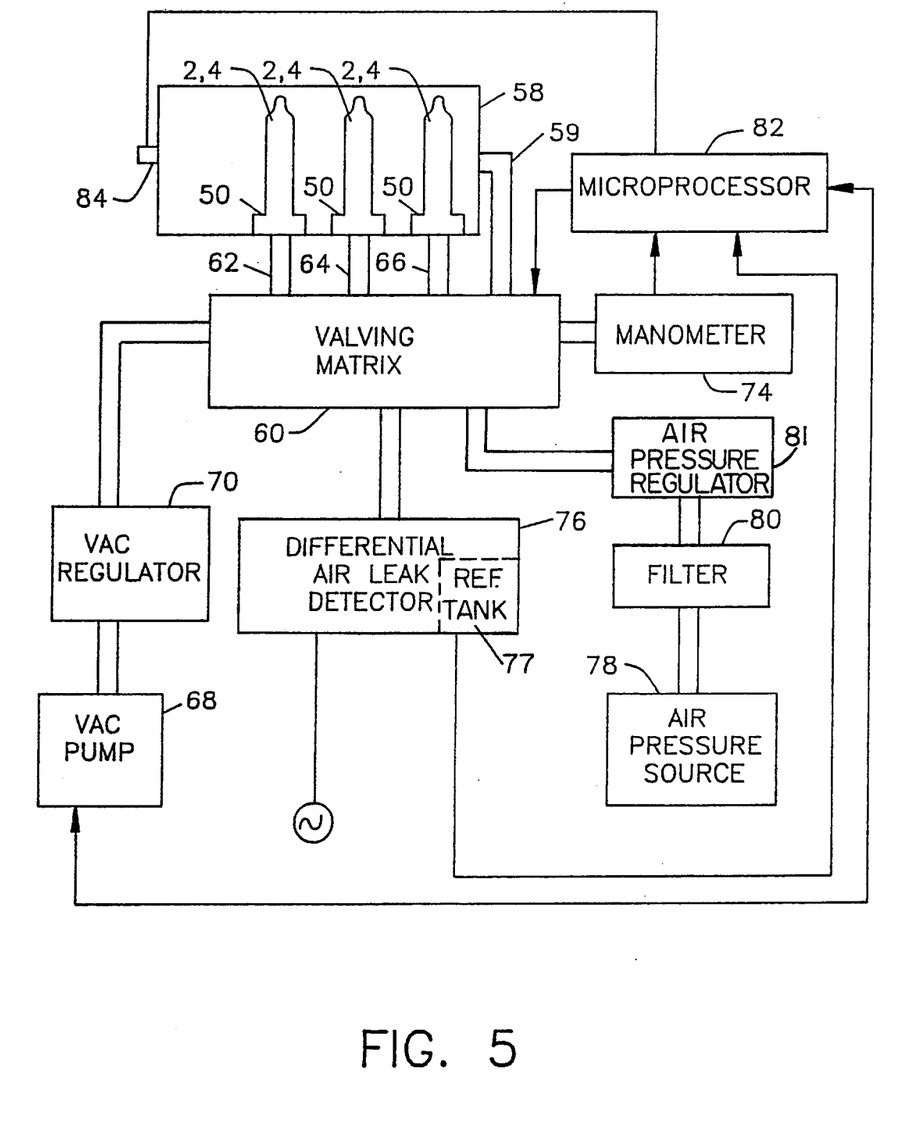
FIG. 5 is a block diagram of equipment used in testing a condom.

Reference is now made to FIG. 5 for a description of equipment for testing condoms for holes in accordance with the method of this invention. In one embodiment, a plurality of mandrels 2,4 are mounted within a sealed box 58 that is connected by a conduit 59 to a valving matrix 60. The mounts 50 of each mandrel are respectively connected by conduits 62, 64, and 66 to the valving matrix 60. A vacuum pump 68 is coupled by a vacuum regulator 78 to the valving matrix 60. A manometer 74, and a differential leak detector 76 are coupled to the valving matrix 60, and a pressurized air source 78 is coupled to the valving matrix 60 via the series connection of an air pressure regulator 81 and a filter 80. Control of this equipment in any of the modes of operation is effected by a microprocessor 82. A suitable leak detector is the Model LS-1940 air leak tester made by the Cosmo Instruments Co., Ltd at 19876 Haggerty Road, Livonia, Md. 48152. USA. The microprocessor 82 operates valves within the valving matrix 60 so as to couple the mandrels (2,4) to the vacuum pump 68, the pressurized air source 78, the manometer 74 and/or the differential leak detector 76 including reference tank 77, as required. The microprocessor 82 can also couple the box 58 to the pressurized air source 78 and the manometer 74 so that a desired air pressure can be created in the box 58, in certain embodiments of the invention. In addition, the microprocessor 82 can operate a valve 84 connecting the box 58 to the atmosphere. Signals representing whether or not the detector 76 finds a leak for each of the mandrels 2,4 are supplied to the microprocessor 82.

In a mode where holes in a condom 40 are to be detected by evacuating the interior of a mandrel 2,4 and providing atmospheric pressure outside it, the microprocessor 82 could be programmed to conduct the test on the three mandrels 2,4 shown in sequence so that each is in a different one of the three periods of operation. For any given one of the mandrels (2,4) the microprocessor 82 would open the valve 84 and couple the mandrel (2,4) to the pressurized air source 78 before the condom 40 is mounted so as to eject powder particles from the mandrel's outer surface. The outside could also be brushed at the same time. A condom 40 is then installed by stretching it over the mandrel (2,4). The vacuum pump 68 would then be coupled to the mandrel (2,4) for a first period of time, and when it is shut off by the valving matrix 60, the absolute pressure in the mandrel is checked by coupling it to the manometer 74. If the pressure is at the low level required, valves are operated so as to isolate the mandrel (2,4) under test from the rest of the system for a second period during which stabilization is attained in the mandrel (2,4) and the reference tank 77 within detector 76. The differential pressure between the mandrel (2,4) and the reference tank 77 is then checked via differential air leak detector 76 for a third period of time. The condom 40 under test is rejected if the pressure differential exceeds a predetermined rate of change. By monitoring the operation of the detector 76, the microprocessor 82 can keep track of the number of condoms 40 rejected and the number accepted by each mandrel (2,4). If there are no rejects for a predetermined number of tests x or no acceptances for y tests, the machine is preferably shut down and serviced. If there are no rejects by one mandrel (2,4) for a predetermined number of tests or no acceptances for another predetermined number of tests, the machine should be shut down and serviced.

Figure 6:
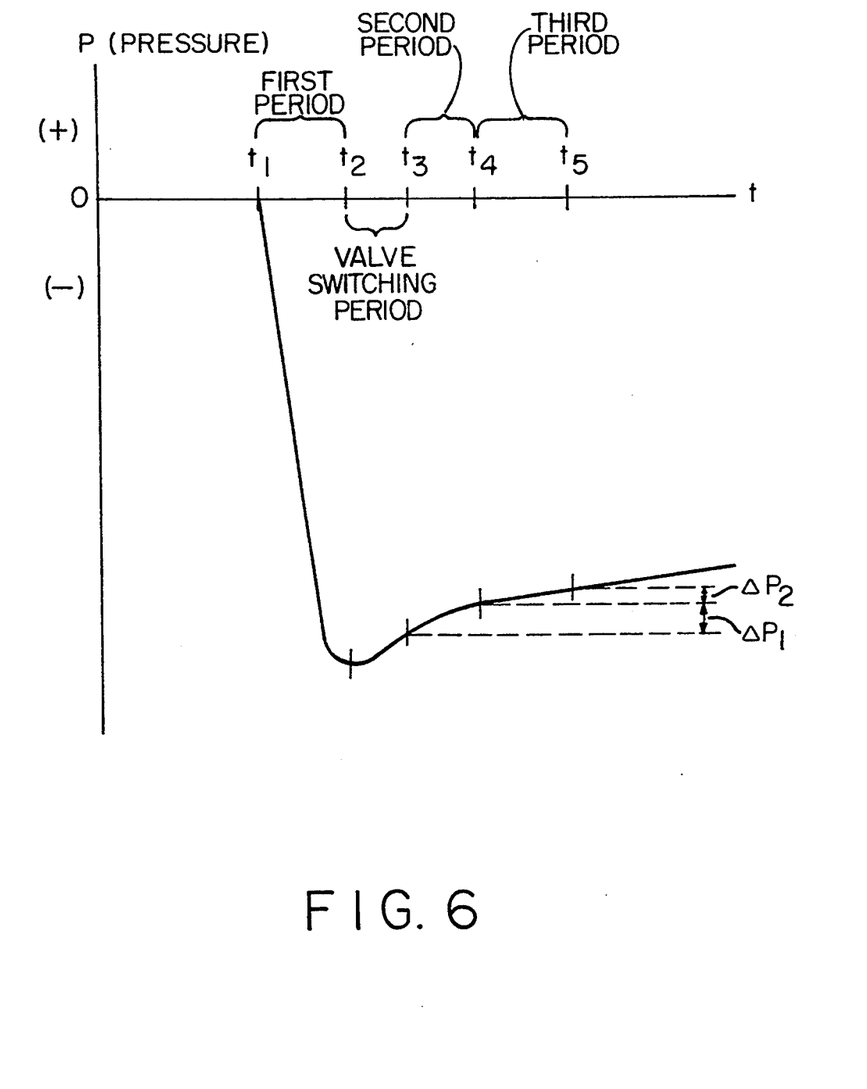
FIG. 6 shows a graph indicating the times respectively required for drawing a vacuum, stabilizing the pressure, and testing for rate of change of pressure, in accepting or rejecting a condom or other prophylactic device being tested.

FIG. 6 shows a graph of pressure (P) versus time (t) for a test cycle to test a prophylactic device, such as a condom 40. At time $t_1$ valving matrix 60 is operated for initiating the pulling of vacuum from the interior of an associated mandrel (2,4) via vacuum pump 68. At time $t_2$, valving matrix 60 is operated for disconnecting vacuum pump 68 from the mandrel (2,4), and sealing-off the latter. After a delay time period, at time $t_3$ the pressure, which should be at a negative level x, is measured via manometer 74. If the vacuum pressure x has not been reached, the condom 40 is rejected. If at least vacuum pressure x has been reached, a predetermined stabilization period is entered between $t_3$ and $t_4$. During the stabilization period the vacuum pressure within the mandrel may decrease by $\Delta P_1$. Next, at time $t_4$, the detection time period is entered for a time period terminating at $t_5$, for determining the rate of change in pressure $[\Delta P_2 \div (t_5 - t_4)]$ in the mandrel (2,4).

If the rate of change exceeds a predetermined value, the condom 40 is rejected, otherwise it is accepted. Note that it is more accurate to balance the pressure within a mandrel (2,4) against the pressure in a reference tank 77, than by directly measuring the pressure in the mandrel (2,4), because temperature changes will effect both sides equally in using the former.

In another embodiment, the apparatus of FIG. 5 is operated in a mode where the pressure inside the mandrel (2,4) is at atmospheric level and the pressure outside is above atmospheric level, the same general procedure is followed except that the valves (not shown) of valving matrix 60 are operated to couple a mandrel (2,4) to atmospheric pressure, and the box 58 is coupled to the source 78 of pressurized air with valve 84 closed to create the pressure differential.

Although various embodiments of the invention have been shown and described herein, they are not meant to be limiting. Those of skill in the art may recognize modifications to these embodiments, which modifications are meant to be covered by the spirit and scope of the appended claims. For example, a tag gas can be included in the atmosphere of a chamber surrounding the mandrel (2,4), and a detector for detecting the tag gas can be employed for testing for the entry of the gas through a condom 40 under test, into the interior portion of the associated mandrel (2,4). In this manner, holes in a condom 40 will be detected. Both tag gas and rate of change of differential pressure, as described, can be employed at the same time for testing a condom. Also, a low molecular weight gas, such as Helium, can be used in place of air in the chamber, for reducing test time due to the faster flow rate through a hole in a condom 40 of Helium relative to air. Also, although condoms have been used in illustrating various embodiments of the invention, many other prophylactic devices such as gloves, catheter covers, and so forth, can be tested via the present embodiments of the invention, and the associated mandrel can be shaped as required.

What is claimed is:

1. A system for testing prophylactic devices for holes comprising:

a hollow mandrel defining a space therein and having an outer shape that conforms to the shape of the device under test, said mandrel having a closed end and an open end;

means defining pores in said mandrel such that the average size of the pores near the closed end of the mandrel are substantially less than the average size of the pores near the open end of the mandrel;

sealed mounting means, for support and airtight attachment of a prophylactic device to the base of the body of said mandrel, connected to the Open end of said mandrel;

means for creating a given differential in gas pressure between the space within the mandrel and space outside it;

means for disconnecting said means for creating a differential in gas pressure; and means for detecting a given change in the gas pressure within the mandrel.

2. A system as set forth in claim 1, wherein said means for creating the differential in pressure reduces the pressure in the space within said mandrel with respect to atmospheric pressure outside it.

3. A system as set forth in claim 1, wherein said means for creating the differential in pressure decreases the pressure of the gas in the space within said mandrel to about −14.0 psi with respect to atmospheric pressure outside it.

4. A system as set forth in claim 1, wherein said means for creating the differential in pressure increases the pressure of the gas outside said mandrel with respect to atmospheric pressure maintained inside it.

5. A system as set forth in claim 1, wherein the cross section of said mandrel is tapered in shape for increasing gradually from the closed end of said mandrel to a cross section of maximum diameter at some point between the closed and open ends, and then decreases gradually towards the open end of said mandrel.

6. A system as set forth in claim 1, wherein the size of said mandrel is greater than the interior dimensions of the device being tested, thereby providing for stretching said device when installed on said mandrel.

7. A system as set forth in claim 1, wherein said means for detecting a change in gas pressure within the mandrel operates by comparing the gas pressure between the inner space of said mandrel with the gas pressure in a reference tank for measuring the differential pressure therebetween.

8. A system as set forth in claim 1, further comprising:

means defining pores in an intermediate section of said mandrel having an average size greater than the average size of the pores near its closed end and less than the average size of the pores near its open end.

9. A system as set forth in claim 1, wherein the cross section of said mandrel is partially tapered such that it increases gradually from its closed end to a cross section of maximum diameter at some point between the closed and open ends, and which cross section of maximum diameter is maintained for a substantial portion of the mandrel to the open end.

10. A mandrel apparatus for use in testing a prophylactic device comprising:

a mandrel having a hollow body having a closed end and an open end;

press-fit means to seal in an airtight manner a prophylactic device to the open end of the body during testing of said prophylactic device;

means defining pores of a given size extending through a portion of said body adjacent its closed end; and means defining pores extending through a portion of said body adjacent its open end that are larger than said given size.

11. A mandrel apparatus for use in testing a prophylactic device comprising:

a mandrel having a hollow body having a closed end and an open end;

press-fit means to seal in an airtight manner a prophylactic device to the open end of the body during testing of said prophylactic device; and means defining pores extending through said body having pores of an average size that increases gradually or step-wise along the length of said mandrel between the closed end of said body and its open end.

* * * * *